United States Patent
Binder et al.

(10) Patent No.: US 8,833,484 B2
(45) Date of Patent: Sep. 16, 2014

(54) CONTROL METHOD FOR A POWER TOOL AND A POWER TOOL

(75) Inventors: Albert Binder, Buchs (CH); Dieter Profunser, Feldkirch (AT); Alexander Hoop, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 200 days.

(21) Appl. No.: 13/280,925

(22) Filed: Oct. 25, 2011

(65) Prior Publication Data

US 2012/0103643 A1 May 3, 2012

(30) Foreign Application Priority Data

Oct. 28, 2010 (DE) .......................... 10 2010 043 032

(51) Int. Cl.
*B23Q 5/08* (2006.01)
*B25D 16/00* (2006.01)
*B25F 5/00* (2006.01)

(52) U.S. Cl.
CPC .............. *B25D 16/003* (2013.01); *B25F 5/001* (2013.01); *B23Q 5/08* (2013.01); *B25D 2250/165* (2013.01); *B25D 2250/221* (2013.01)
USPC ................... 173/1; 173/2; 173/176; 173/178; 173/217; 192/48.2; 192/56.42

(58) Field of Classification Search
CPC .... B25D 16/00; B25D 16/003; B25D 16/006; B25D 2250/221; B25D 2250/165; B23Q 5/06; B23Q 5/08; B25F 5/00; B25F 5/001
USPC ......... 173/1, 2, 176, 178, 181, 182, 183, 216, 173/217; 192/48.2, 56.42
See application file for complete search history.

(56) References Cited

U.S. PATENT DOCUMENTS

| | | | | |
|---|---|---|---|---|
| 4,340,133 | A * | 7/1982 | Blersch ...................... | 192/30 W |
| 5,401,124 | A * | 3/1995 | Hettich ............................. | 408/6 |
| 5,419,745 | A * | 5/1995 | Moolenaar et al. ............. | 477/20 |
| 5,868,208 | A * | 2/1999 | Peisert et al. .................. | 173/178 |
| 5,914,882 | A * | 6/1999 | Yeghiazarians ................ | 700/177 |
| 6,044,918 | A * | 4/2000 | Noser et al. .................... | 173/176 |
| 6,111,515 | A * | 8/2000 | Schaer et al. .................. | 340/680 |
| 6,484,814 | B2 * | 11/2002 | Bongers-Ambrosius ......... | 173/2 |
| 6,843,327 | B2 * | 1/2005 | Meixner et al. ................. | 173/11 |
| 6,863,165 | B2 * | 3/2005 | Koslowski .................... | 192/48.2 |
| 6,981,557 | B2 * | 1/2006 | Boeni et al. ...................... | 173/1 |
| 7,644,783 | B2 * | 1/2010 | Roberts et al. ................ | 173/178 |

FOREIGN PATENT DOCUMENTS

| | | |
|---|---|---|
| EP | 1 358 969 A2 | 11/2003 |
| EP | 1 452 278 A1 | 9/2004 |

OTHER PUBLICATIONS

European Search Report, dated Feb. 22, 2012, 8 pages total.

* cited by examiner

*Primary Examiner* — Scott A. Smith
(74) *Attorney, Agent, or Firm* — Crowell & Moring LLP

(57) ABSTRACT

A control method for a power tool and a power tool is disclosed. The control method has an operating mode and a safety mode. In the operating mode, a motor drives a tool receptacle in a rotating manner. In the operating mode, the motor has a power consumption in the amount of at least an operating value. The safety mode is triggered if a sensor device detects a rotational blockade of the tool receptacle. In the safety mode, a clutch that is switchable by electrical signals located in the drive train between the motor and tool receptacle is periodically opened and closed and a power consumption of the motor is reduced as compared to the operating value.

8 Claims, 2 Drawing Sheets

CONTROL METHOD FOR A POWER TOOL AND A POWER TOOL

This application claims the priority of German Patent Document No. 10 2010 043 032.3, filed Oct. 28, 2010, the disclosure of which is expressly incorporated by reference herein.

BACKGROUND AND SUMMARY OF THE INVENTION

The present invention relates to a control method for a power tool and a power tool.

The control method for a power tool according to the invention has an operating mode and a safety mode. In the operating mode, a motor drives a tool receptacle in a rotating manner around a working axis. The motor has a power consumption in the operating mode in the amount of at least an operating value. The safety mode is triggered if a sensor device detects a rotational blockade of a tool receptacle. In the safety mode, a clutch that is switchable by electrical signals located in the drive train between the motor and tool receptacle is periodically opened and closed, and a power consumption of the motor is reduced as compared to the operating value.

In the safety mode, the power consumption of the motor is reduced as compared to the operating mode. At the same time, the motor is repeatedly decoupled from the tool receptacle and recoupled to the tool receptacle. A tool inserted into the tool receptacle is rotated in a pulsed manner during the safety mode.

The following description explains the invention on the basis of exemplary embodiments and figures.

DETAILED DESCRIPTION OF THE DRAWINGS

Unless otherwise indicated, the same or functionally equivalent elements are identified by the same reference numbers in the figures.

Figure 1:
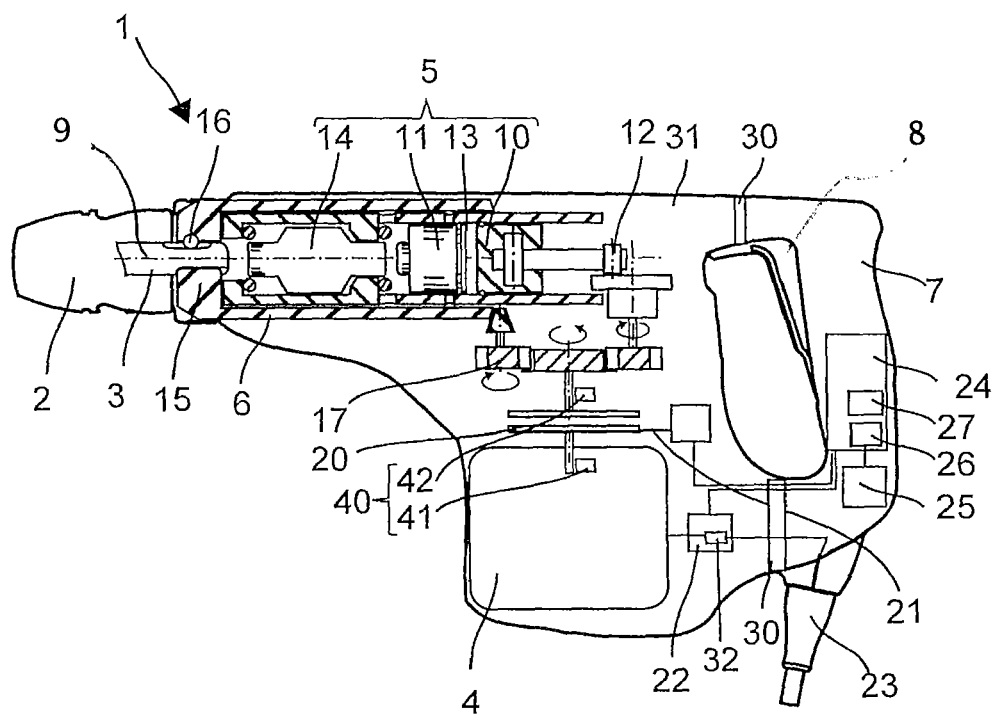
FIG. 1 illustrates a hammer drill in accordance with the principles of the present invention.

FIG. 1 schematically shows a hammer drill 1. The hammer drill 1 has a tool receptacle 2, into which a drill bit 3 may be inserted as a tool. A primary drive of the hammer drill 1 is formed by a motor 4, which drives a striking mechanism 5 and an output shaft 6. An operator may operate the hammer drill 1 by a hand grip 7 and may put the hammer drill 1 into operation by a system switch 8. During operation, the hammer drill 1 rotates the drill bit 3 continuously around a working axis 9 and, in doing so, may drive the drill bit 3 along the working axis 9 into a substrate.

The striking mechanism 5 is a pneumatic striking mechanism 5, for example. An exciter 10 and a striking device 11 are moveably guided in the striking mechanism 5 along the working axis 9. The exciter 10 is coupled to the motor 4 via an eccentric 12 or a wobble finger and forced into a periodic, linear movement. A pneumatic spring formed by a pneumatic chamber 13 between the exciter 10 and the striking device 11 couples a movement of the striking device 11 to the movement of the exciter 10. The striking device 11 may strike directly on a rear end of the drill bit 3 or indirectly transmit a portion of its impulse to the drill bit 3 via an essentially resting intermediate striking device 14.

The tool receptacle 2 has a sleeve 15, into which an end of the drill bit 3 may be inserted. Locking elements in the sleeve 15 secure the drill bit 3 against falling out. The sleeve 15 has an internal non-rotationally symmetrical contour that is form-fitting with the drill bit 3, which transmits a torque from the sleeve 15 to the drill bit 3. Pins or balls 16 projecting radially inwardly may be provided in the sleeve 15, for example.

The torque is made available by the motor 4 and relayed via a drive train to the sleeve 15. The drive train includes, for example, the output shaft 6 and a gear mechanism 17 between the motor 4 and the output shaft 6. The gear mechanism 17 may, for example, adapt a rotational speed of the motor 4 to a desired rotational speed of the drill bit 3. An electrically switchable, externally controlled clutch 20 in the drive train makes it possible to interrupt the transmission of torque between the motor 4 and the sleeve 15 in response to the control signals 21 fed to the clutch 20.

The rotational speed of the motor 4 may be regulated by a motor control unit 22 to a target value or be limited to a maximum value. A power consumption of the motor 4 during operation, the operating value, corresponds preferably approximately to the nominal power of the motor 4, whereby an optimum ratio of power and weight is obtained. The motor 4 is preferably an electric motor, particularly a mechanically commutated universal motor. The electric motor is supplied by a battery or via a connection to the power system 23. Alternatively, an internal combustion engine may be used, which is supplied with gaseous or liquid fuel, for example.

A safety device 24 detects a rotary movement of the hammer drill 1, in particular of the hand grip 7 of the hammer drill 1, around the working axis 9, for example, by an acceleration sensor 25. The acceleration sensor 25 is arranged, for example, spaced apart from the working axis 9. A rotation of the hammer drill 1 is a typical indication of a rotational blockade of the drill bit 3 in the substrate. The operator may no longer exert an adequate holding torque on the hand grip 7 in order to counteract the torque acting on the substrate from the hammer drill 1. In order to prevent a possible injury to the operator, e.g., a twisting of the wrist joint, a controlled interruption of the operation of the hammer drill is initiated by a safety mode.

The signals from the acceleration sensor 25 are conveyed to an evaluation device 26 of the safety device 24. A memory device 27 of the evaluation device 26 stores one or more samples of signals, which are allocated to a rotational blockade. The samples, for example, may be threshold values for the acceleration values, limit values for integrated acceleration values, etc. The evaluation device 26 triggers the safety mode when the signals match a sample.

Figure 2:
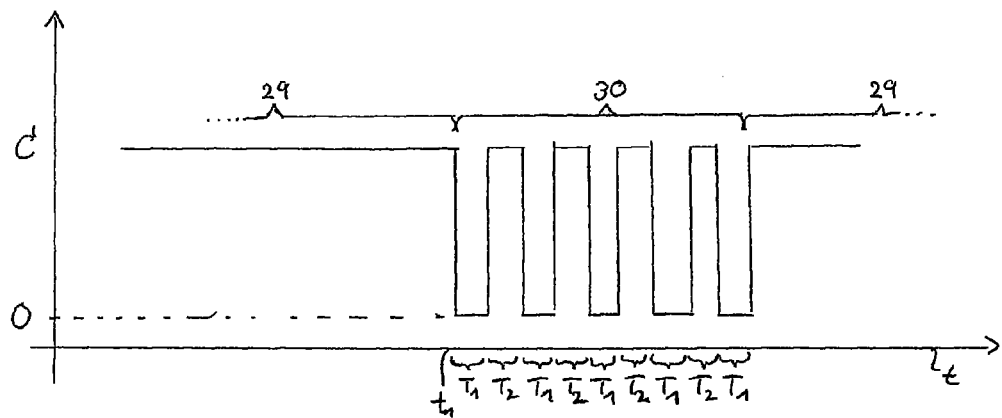
FIG. 2 illustrates a switching sequence of a switchable clutch of the hammer drill.

FIG. 2 shows the switching status of the switchable clutch 20 over time, wherein at time point t1, the operating mode 29 is superseded by the safety mode 30. In operating mode 29, the switchable clutch 20 is coupled in on a sustained basis (status C, in order to transmit a torque). In safety mode 30, the switchable clutch 20 is periodically decoupled (status O) and coupled several times by the control signals 21 of the evaluation device 26. The motor 4 is thus repeatedly and alternatingly decoupled and coupled from/to the tool receptacle 2 and the sleeve 15 thereof. The switchable clutch 20 is decoupled in cycles for a first phase T1 and coupled for a second phase T2. A cycle is preferably made up of the first phase T1 and the second phase T2.

Figure 3:
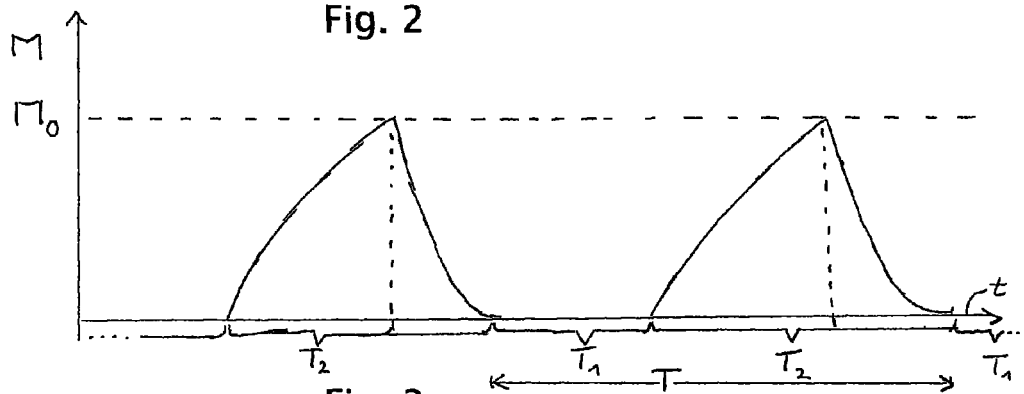
FIG. 3 illustrates a time progression of a torque applied to a tool receptacle of the hammer drill.

Because of its inertia, the hammer drill 1 reacts with a delay to the switching cycles of the evaluation device 26. When the switchable clutch 20 is coupled in, the torque M applied to the tool receptacle 2 increases during the second phase T2. The delay of the transmission of torque is produced by the inertia of the moved elements in the drive train. FIG. 3 schematically shows the torque M applied to the tool receptacle 2. A duration of the second phase T2 is preferably selected such that the applied torque M reaches a maximum value Mo, which the motor 4 is momentarily able to deliver. A holding torque of the clutch 20 is preferably greater than the maximum value Mo of the motor 4. Slipping does not occur. The clutch 20 preferably does not begin to slip under load. The duration of the second phase T2 may be definitively pre-selected, for example in a range of 2 ms to 5 ms.

The total duration T of a cycle is preferably selected by the choice of the first phase T1 in a range between 20 ms and 50 ms. Therefore, the repetition rate of opening and closing lies in a range between 20 Hz and 50 Hz. The stress exerted on the operator by the hammer drill 1 from the periodically transmitting clutch 20 may be damped by additional damping elements 30 between the hand grip 7 and the machine housing 31.

The supply to the motor 4 is interrupted during safety mode. The motor control unit 22 may interrupt, for example, the supply of current to the motor 4 by one or more switching elements 32. The motor 4 does not draw any power from the primary energy source, for example, in the case of an electric motor, from the connection to the power supply 23 or a battery. Rotational energy from the preceding operating mode is stored in the rotating components of the hammer drill 1, in particular of the motor 4. The rotational energy is retained because of low-friction bearings during the first phase T1, because the motor 4 is decoupled from the tool receptacle 2 by the switchable clutch 20. During the second phase T2, the motor 4 performs work by transmitting a torque to the drive train, i.e., the output shaft 6, the tool receptacle 2, and the drill bit 3. The rotational energy of the motor 4 diminishes in the process with each second phase T2. It has been shown that the preferably used electric motors with rotational speeds of more than 10,000 revolutions per minute are able to store sufficient rotational energy for at least ten clutch engagements and, in the case of the ten clutch engagements of the motor 4, a peak torque Mo of at least 90% of its nominal torque can be delivered in operating mode.

During safety mode, the safety device 24 checks the rotational acceleration of the power tool 1 around the working axis 9. If the rotational acceleration against a rotational direction of the drill bit 3 falls short of a threshold value during a cycle T, the safety mode will be ended. The threshold value is, for example, 20 m/s/s. The size of the threshold value depends on the holding torque, which the operator is able to muster. The drill 1 goes into operating mode 29. The motor 4 is again connected with its energy source for power consumption. The motor 4 typically accelerates again to its nominal rotational speed. The alternating coupling and decoupling of the switchable clutch 20 is ended and the switchable clutch 20 is coupled in on a sustained basis.

Instead of a definitively adjusted duration of the second phase T2, this duration may be determined dynamically during the safety mode. Torque sensors 40 are able to measure and compare the torque delivered by the motor 4 and the torque applied to the tool receptacle 2. These types of torque sensors 40 may be based, for example, on a respective rotational speed monitor 41 in front of and a rotational speed monitor 42 after the switchable clutch 20. As soon as the rotational speeds measured by the two rotational speed monitors 41, 42 conform, the torque of the motor 4 will be transmitted completely. The evaluation device 26 issues the control signal 21 for disengaging the switchable clutch 20, and therefore, ends the second phase T2 in this cycle. In addition, a maximum value may be provided, which limits the duration of the second phase T2, during which the switchable clutch 20 is coupled in.

Another embodiment provides that a rotational speed of the motor 4 is monitored during safety mode. The motor 4 is connected in the meantime to the energy supply in case a rotational speed falls below a predetermined threshold value. The threshold value preferably lies between 20% and 70% of the nominal rotational speed of the motor 4 in operating mode. Another embodiment provides for decelerating the motor 4 to a rotational speed equal to a value in a range between 20% and 70% of the nominal rotational speed, e.g., the upper threshold value. The deceleration is able to support the dissipation in the clutch 20, for example, by a generator operation of the motor 4. The generated electrical power may be dissipated via load resistors.

Another embodiment provides for a switchable clutch 20, which is able to transmit at least one first torque in a first mode and a second torque in a second mode. The second torque is preferably between 20% and 50% of the first torque. During safety mode, the clutch 20 changes between the first mode and the second mode in an alternating manner. The clutch 20 may be kept in the first mode for the first phase T1 and in the second mode for the second phase T2. The motor 4 is permanently coupled to the tool receptacle 2 and consequently continuously dissipates its rotational energy.

Figure 4:
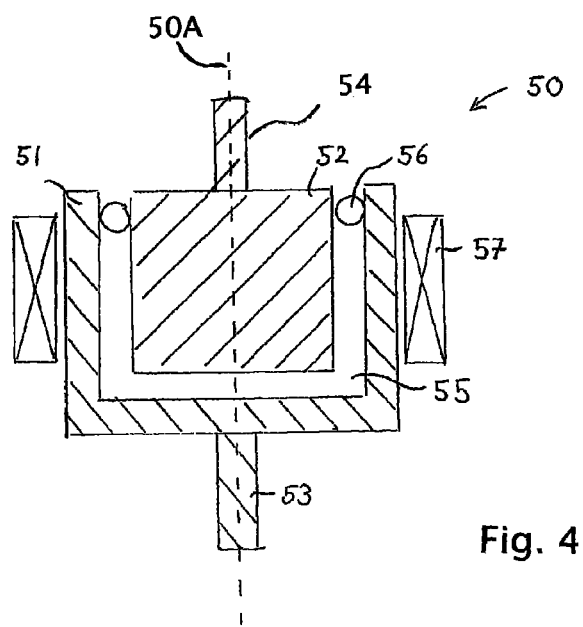
FIG. 4 illustrates a rheological clutch.

FIG. 4 shows an exemplary rheological clutch 50, which is especially suited as a design for a switchable clutch 20. The rheological clutch 50 has a jacket 51, within which a preferably cylindrical head piece 52 is arranged so that it can rotate around an axis of rotation 50A. The jacket 51 may be connected to a first shaft 53 and the head piece 52 to a second shaft 54. A hollow space 55 of the jacket 51 with the head piece 52 situated therein is closed by a sealing element 56, for example, an O-ring on the second shaft 54.

A rheological fluid is filled into the hollow space 55. The rheological fluid contains magnetic particles such as iron particles, which align in the fluid under an applied magnetic field. In the process, the viscosity of the rheological fluid increases and a transmission of torque takes place between the head piece 52 and the jacket 51. Arranged next to or around the jacket 51 is a magnetic coil 57, by which a magnetic field penetrating the hollow space 55 and the rheological fluid may be applied. The magnetic coil 57 is triggered by the control signals 21 of the safety device 24. During the first phase T1, a current flows through the magnetic coil 57. During the second phase, no current or current that is less than that of the first phase T1 by at least 50% flows through the magnetic coil 57.

An alternative embodiment provides for a permanent magnet. An additional magnetic coil generates a magnetic field that compensates for the magnetic field generated by the permanent magnet in the hollow space in order to decouple the switchable clutch.

During the first phase T1, a current flows through the magnetic coil, and during the second phase T2, no current flows through the magnetic coil.

The exemplary embodiments described relate to a hammer drill as an example of a hand-operated power tool with a rotating tool. The invention likewise includes other hand-operated power tools with rotating tools, which penetrate into a workpiece along the axis of rotation, e.g., diamond drilling equipment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control method for a power tool, comprising the steps of:
   driving a tool receptacle by a motor in a rotating manner around a working axis in an operating mode, wherein a power consumption of the motor has an operating value in the operating mode; and
   triggering a safety mode when a safety device detects a rotational blockade of the tool receptacle;
   wherein the safety mode further comprises the steps of:
   periodically varying a torque of a clutch that is arranged in a drive train between the motor and the tool receptacle; and
   reducing the power consumption of the motor in comparison to the operating value.

2. The control method according to claim 1, wherein the step of periodically varying the torque of the clutch includes the step of periodically decoupling and coupling the clutch.

3. The control method according to claim 1, further comprising the step of disconnecting the motor from an energy supply in the safety mode.

4. The control method according to claim 1, further comprising the steps of:
   detecting a rotational acceleration of the power tool around the working axis by a sensor device; and
   ending the safety mode and resuming the operating mode when the rotational acceleration falls short of a threshold value.

5. A power tool, comprising:
   a tool receptacle;
   a motor;
   a drive train, wherein a rotary movement of the motor is transmittable to the tool receptacle by the drive train;
   a clutch, wherein the clutch is arranged in the drive train;
   a sensor device, wherein a control signal is issuable by the sensor device when a rotational movement of the tool receptacle is blocked;
   an evaluation device, wherein a torque of the clutch is periodically variable by the evaluation device in response to the control signal; and
   a motor control unit coupled to the motor, wherein a power consumption of the motor is reducible by the motor control unit in response to the control signal.

6. The power tool according to claim 5, wherein the motor control unit has a switching element and wherein a supply of energy to the motor is interruptible by the switching element in response to the control signal.

7. The power tool according to claim 5, wherein the clutch contains a rheological fluid.

8. The power tool according to claim 7, wherein the clutch has a head piece and a jacket, wherein the jacket encloses the head piece in a radial direction, and wherein the rheological fluid is disposed between a radial outer surface of the head piece and a radial inner surface of the jacket.

* * * * *